Nov. 13, 1934.　　　　F. E. STAHL　　　　1,980,935
ELECTRIC WELDING MACHINE
Filed June 23, 1933　　3 Sheets-Sheet 3

INVENTOR
FRANK E. STAHL
By J. Wm Ellis
ATTORNEY

Patented Nov. 13, 1934

1,980,935

UNITED STATES PATENT OFFICE 1,980,935

ELECTRIC WELDING MACHINE

Frank E. Stahl, Tonawanda, N. Y.

Application June 23, 1933, Serial No. 677,296

9 Claims. (Cl. 219—4)

My invention relates in general to electric welding machines, and in particular to those machines that are used in the welding of links for chains.

It is well known to those skilled in the art that it is now common practice to form lengths of chain by bending the metal links into appropriate form, with the ends of the blanks from which the links are made in abutting relation, and then electrically welding the abutting ends by applying electric welding heat thereto, and at the same time subjecting the link to end pressure. It is, however, also well known that since the ends of such blank forming the link are in substantial parallel relationship, gas pockets are formed in the welded surface and foreign matter is entrapped therein, with the result that oxidation occurs, thus weakening the weld. This is particularly so on the larger sizes of wire or rod used in the formation of the blank. Moreover, in such joints the portions which first contact are many times heated above the desired temperature before the rest of the surfaces becomes heated with the result that the metal is likely to become burned. Particularly is this so in the welding of high carbon or certain alloy steels, particularly those containing nickel where there is a very limited tolerance as to welding temperature. In order to produce a perfect weld in such cases, the temperature of the welding heat must be kept within very narrow limits.

I have discovered that if, instead of the substantially flat abutting surfaces, the ends of the blanks be formed with points having decreasing cross-sectional area either of chisel or pyramid shape, the weld will start at the central portion of the ends of the link and work outwardly to the outer periphery of the blank, thus obviating the formation of gas pockets and producing a weld which is substantially perfect. In order to properly weld a chain link having such ends, it is necessary that the pressure applied to the heated ends be maintained substantially constant while the ends are being pushed toward each other as the welding area is increasing.

The principal object of my invention, therefore, has been to provide a welding machine whereby link blanks having V-shaped or pyramidal shaped ends may be efficiently and perfectly welded.

Another object has been to provide a machine having means for following up and maintaining the pressure upon the welded joint until the joint is completed.

Moreover, my invention contemplates the provision of electric switch actuating means which shall work in synchronism with the pressure means.

The above objects and advantages have been accomplished by the device shown in the accompanying drawings, of which:

Figure 1:
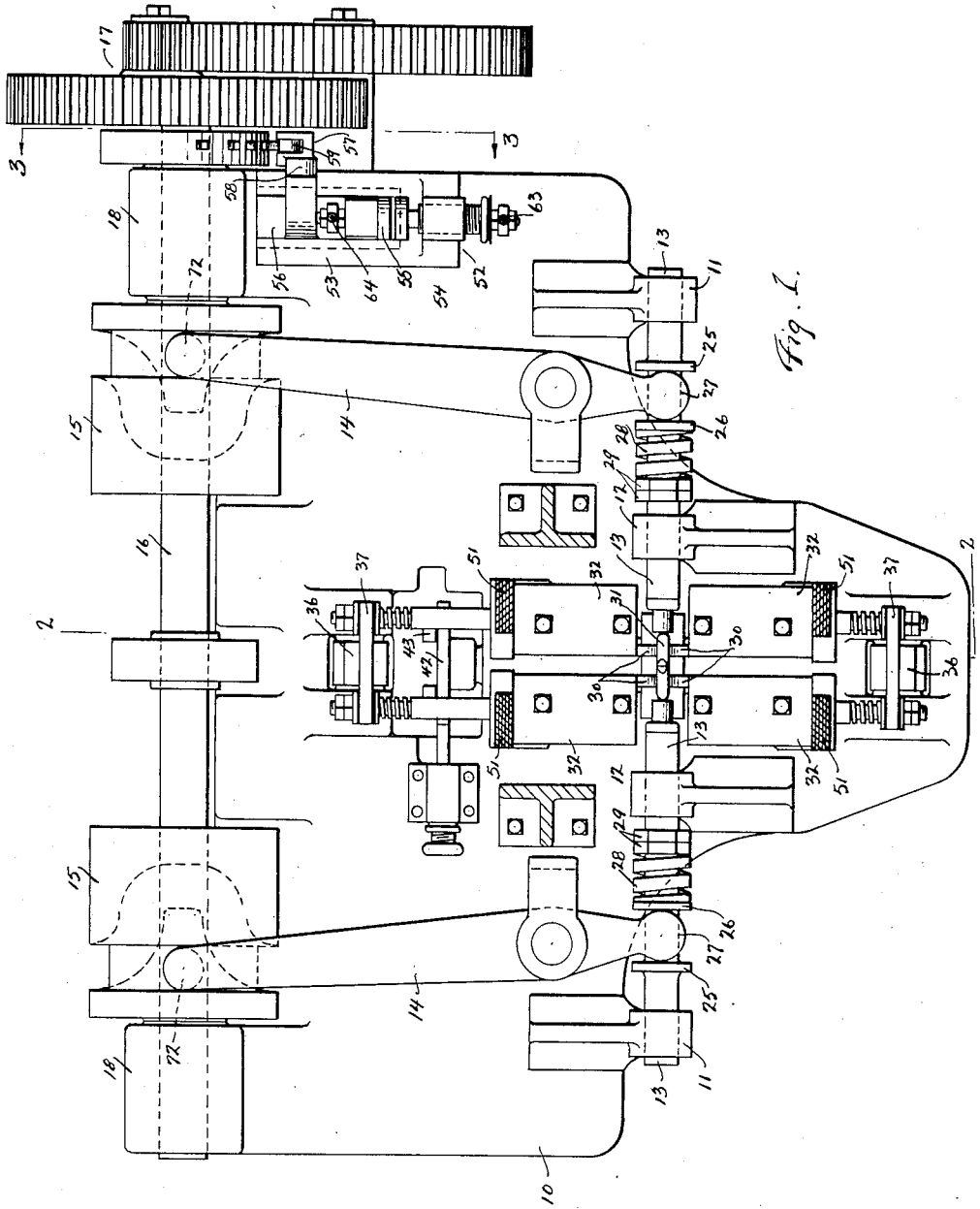
Fig. 1 is a plan view of a chain welding machine embodying my invention, with the transformer removed for clearness of illustration.
Figure 2:
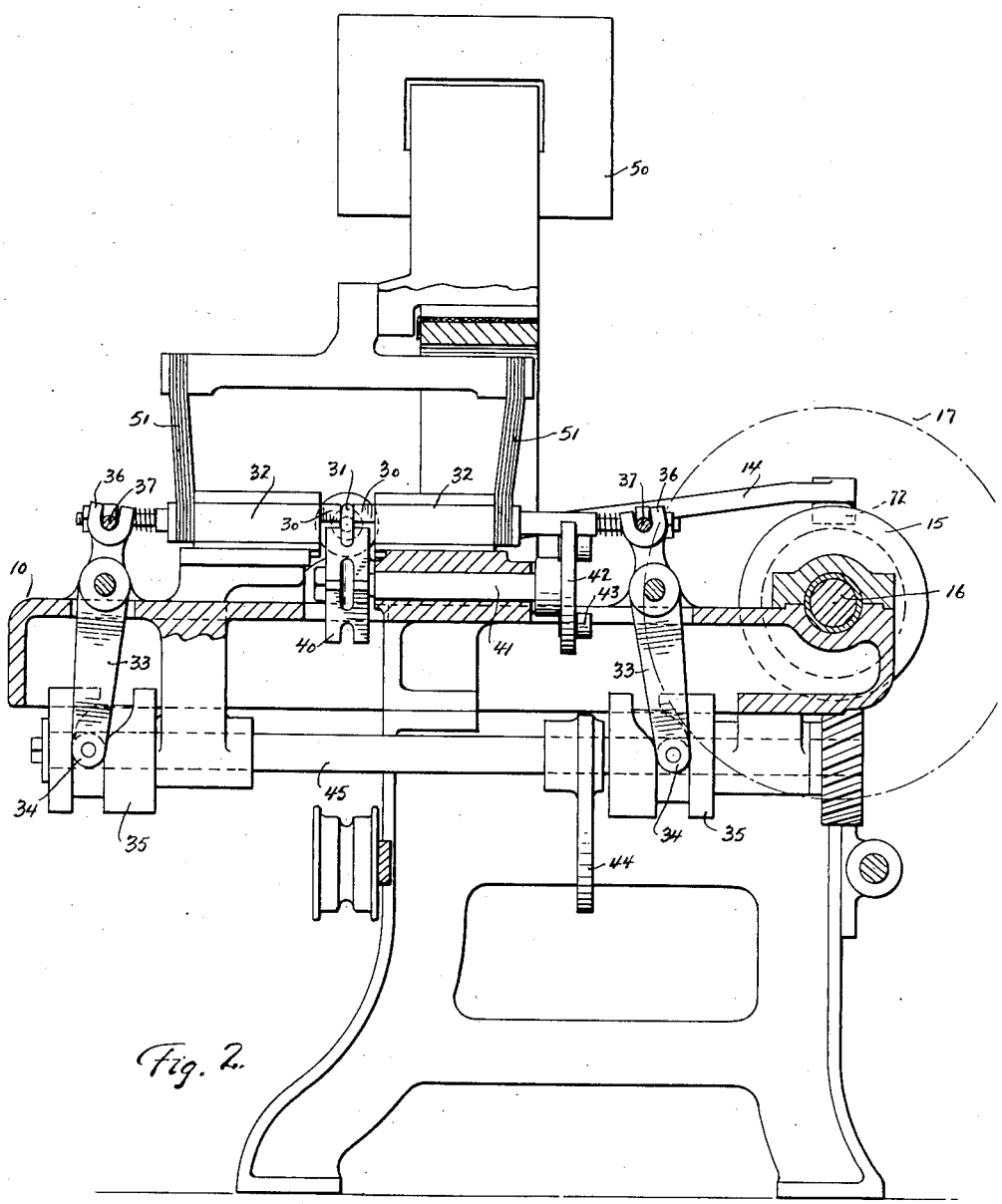
Fig. 2 is an end, sectional elevation thereof, taken on line 2—2 of Fig. 1.

My device comprises a suitable bed 10 which carries at its forward end two sets of bearings 11 and 12. A pusher 13 is mounted in each pair of bearings 11 and 12. These pushers are reciprocated toward each other by means of pusher arms 14 which are actuated by pusher cams 15. These cams are mounted upon a cam shaft 16 which is driven through suitable gearing 17. This shaft is mounted in suitable bearings 18 carried by the bed of the machine.

Each of the pushers has a fixed collar 25 and a loose collar 26. The forward end 27 of each pusher arm is bifurcated and straddles the pusher 13, engaging the fixed collar 25 at one side and the loose collar 26 at the opposite side. A helical spring 28 engages the loose collar 26 to hold it against the bifurcated end 27 of the arm and the spring is held in place by adjustable nuts 29 carried by the pushers.

The machine is provided with the customary electrodes 30 which are movable into contact with the chain link 31. These electrodes are mounted upon electrode carriers 32 which are reciprocally carried in suitable slides mounted upon the bed of the machine. The carriers are reciprocated by electrode arms 33, the lower ends 34 of which engage electrode cams 35. The upper ends 36 of the electrode arms engage cross-pins 37 each of which forms a yoke connected to each pair of electrode carriers.

The chain is supported by a turning sprocket 40 which is carried by a shaft 41, having at its outer end a disc 42. The disc 42 carries suitable pins 43 which are engaged by the turning cam 44 and at suitable intervals the turning sprocket will, therefore, successively bring links into welding position. The turning cam 44 is preferably carried by the electrode cam shaft 45.

The transformer of the welding machine is represented at 50 and the current is conducted to the carriers from the proper winding of the transformer through flexible bars 51, as is common practice.

Figure 3:
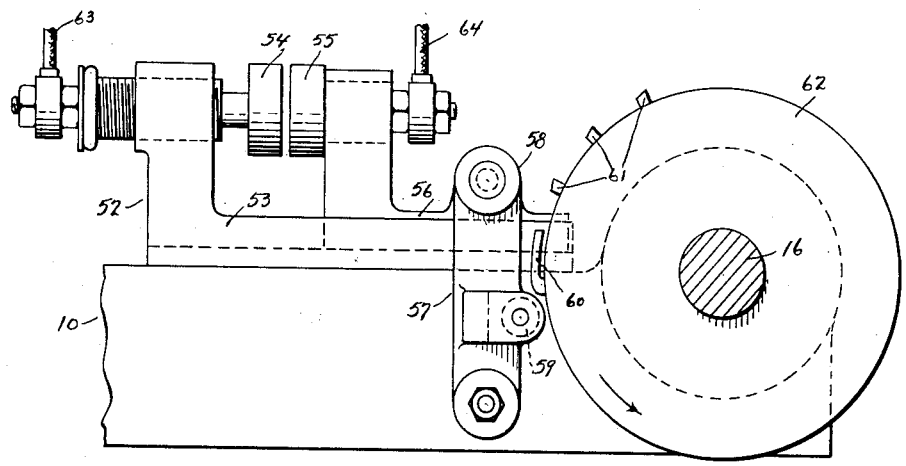
Fig. 3 is an enlarged, sectional elevation, taken on line 3—3 of Fig. 1.

Arranged at one side of the bed 10 is the electric switch 52 of my machine. This switch, as shown in Fig. 3, comprises the usual stationary base 53 which carries in an adjustable manner the stationary electrode 54. The movable electrode 55 is mounted upon a slide 56 which travels in suitable ways formed in the stationary base 53. An operating arm 57 is pivotally carried by the bed 10 of the machine and its upper end 58 is suitably connected to the slide 56. A roller 59 is mounted at the rear side of the operating arm 57 and this roller is engaged by a contact arm 60 and contact pins 61 carried by the contact disc 62. This disc is preferably mounted upon the cam shaft 16 so that it may be operated in synchronism with the operation of the pushers 13. Suitable electrodes 63 and 64 carry current to and through the switch mechanism.

Figure 4:
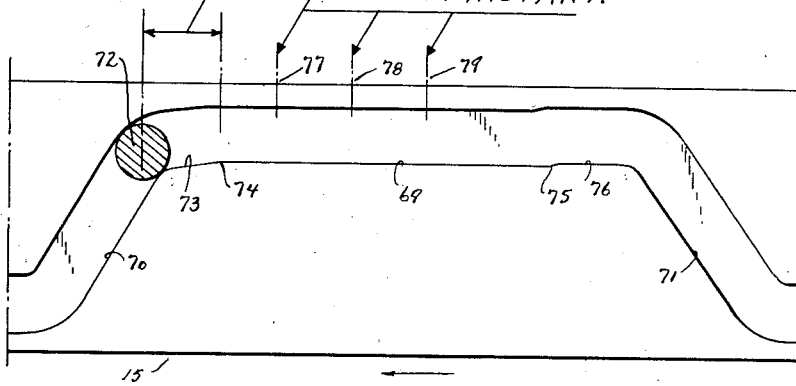
Fig. 4 is a diagrammatical view showing the pusher cam layout.

The cams 15 are for the purpose of actuating the pushers 13 to force the joint together during the welding operation and to move the pushers away from the finished link so as to permit another link to take its place. A layout of this cam is shown in Fig. 4. The surfaces 70 and 71 serve, respectively, when engaged with the usual roller 72 carried by the pusher arm, to move the pusher toward and away from the link being acted upon. Connecting the inclined surfaces 70 and 71 is the operating surface which is brought into action during the welding operation and comprises a gradually inclined portion 73 extending from the upper end of the inclined portion 70 and terminating substantially at point 74. From point 74 to point 75 the roller travels over portion 69 of the cam surface in the same plane and during that travel the pusher is maintained in the same position, but at point 75 there is a rise above the surface portion 69 to the level of the surface portion 76 which terminates at the upper end of the inclined surface 71. Obviously, the ends of the inclined surfaces 70 and 71 which are opposite the working surface of the cam are connected together.

As hereinbefore stated, when welding the joint of chain links, which joints are formed either V-shaped or of pyramidal form, there is considerable movement of opposite sides of the link as the joint is closed up during the process of welding or until the cross-sectional area is equal to and slightly beyond the cross-sectional area of the body of the stock of the link. This is owing to the decreased cross-sectional area of the abutting ends. In order to properly weld such a joint, it is necessary that the pushers not only follow up the joint after the metal is heated and the welded area increases, but it is also necessary that the proper pressure be maintained upon the joint after the sides of the link adjacent the joint have been moved toward each other in completing the weld. This is accomplished by the surface portions 73 and 69 of my pusher cams. The control disc 62 is so synchronized with the pusher cams that the arm 60 of such control disc is brought into contact with the roller 59 and causes the closing of the circuit through the contacts 54 and 55 at a point at or just preceding the position of the roller 72, as shown in Fig. 4, and the length of this arm 60 is such as to maintain the flow of current through the joint during the full period of welding or until the roller 72 has reached the point 74 of the cam.

The pressure exerted upon the joint when the roller 72 reaches the point 74 is maintained while the roller is traveling over the surface 69. The length of the control arm 60 is such as to keep the electric contacts closed during the time the roller 72 is traveling over the surface portion 73 and until it reaches substantially the point 74, at which time the end of the arm has been reached and the contacts 54 and 55 are separated, thus breaking the circuit and interrupting the flow of current passing through the welded joint. The roller now passes over the surface portion 69 of the cam, during which time the pressure is maintained, thus permitting the weld to set. During the time that the pressure is maintained on the welded joint, pins 61 carried by the control disc 62 cause the contacts 54 and 55 to be intermittently and momentarily closed, thus causing current to intermittently flow through the welded joint for the purpose of maintaining the proper temperature for subsequent reforming of the swell or bulge produced in the welded joint. This swell reforming device forms no part of this application and is, therefore, not shown or described. The application of such swell reforming mechanism to the weld, however, is effected at about the time the roller 72 reaches the point 75 of the pusher cam and they are acting upon the joint during the travel of the roller over the surface portion 76 of the cam. As soon as the roller 72 has reached the top of the inclined surface 71 of the cam, it will cause the pusher to be quickly withdrawn from the finished link, whereupon the turning sprocket 40 will be operated, thus causing another link to be brought into operative position. The points of intermittent application of electricity to the welded joint by means of the pins 61 is diagrammatically shown in Fig. 4 by the lines 77, 78 and 79. Immediately after the application of current at a point corresponding to the line 79 the electrode carriers are withdrawn by means of the arms 33 and cams 35 and are held out of working position until the next link has been fed into operative position and until the pushers are ready to again act upon the link.

Figure 5:
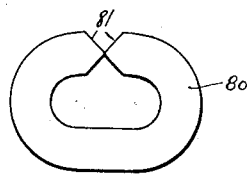
Fig. 5 is a side elevation of one of the links before being welded by my machine.

In Fig. 5 where I show one of the links formed and ready for welding, 80 represents the link and 81 the V-shaped ends thereof.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. Pusher cams for welding chain links having tapered ends on electric chain link welding machines, each cam having an inclined surface portion so formed that a follow-up pressure is exerted upon opposite sides of the link until the tapered ends have been reduced in length and the cross-sectional area of the joint is substantially the same as the cross-sectional area of the body of the link, and being also formed with a straight surface portion so that pressure is maintained upon the joint until the weld has set.

2. Pusher cams for welding chain links having tapered ends on electric chain link welding machines, each cam having an inclined surface portion so formed that a follow-up pressure is exerted upon opposite sides of the link until the tapered ends have been reduced in length and the cross-sectional area of the joint is substantially the same as the cross-sectional area of the body of the link, a substantially straight surface portion lying in a plane substantially perpendicular to the axis of the cam for maintaining pressure upon the joint until the weld has set, and a surface portion lying in a different plane than the straight surface portion, whereby additional pressure is applied to the finished weld.

3. The combination, in a machine for welding chain links which have tapered ends, of pushers for forcing the heated ends of the link together for effecting a weld, electrodes for heating the ends of the links, and cams for actuating the pushers, each cam having an inclined surface portion so formed that a follow-up pressure is exerted upon opposite sides of the link until the tapered ends have been reduced in length and the cross-sectional area of the joint is substantially the same as the cross-sectional area of the body of the link, and being also formed with a straight surface portion so that pressure is maintained upon the joint until the weld has set.

4. The combination, in a machine for welding chain links which have tapered ends, of pushers for forcing the heated ends of the link together to effect a weld, electrodes for heating the ends of the links, and cams for actuating the pushers, each cam having an inclined surface portion so formed that a follow-up pressure is exerted upon opposite sides of the link until the tapered ends have been reduced in length and the cross-sectional area of the joint is substantially the same as the cross-sectional area of the body of the link, and a substantially straight surface portion lying in a plane substantially perpendicular to the axis of the cam for maintaining pressure upon the joint until the weld has set.

5. The combination, in a machine for welding chain links which have tapered ends, of pushers for forcing the heated ends of the links together to effect a weld, electrodes for heating the ends of the links, and cams for actuating the pushers, each cam having an inclined surface portion so formed that a follow-up pressure is exerted upon opposite sides of the link until the tapered ends have been reduced in length and the cross-sectional area of the joint is substantially the same as the cross-sectional area of the body of the link, a substantially straight surface portion lying in a plane substantially perpendicular to the axis of the cam for maintaining pressure upon the joint until the weld has set, and a surface portion lying in a different plane than the straight surface portion, whereby additional pressure is applied to the finished weld.

6. The combination, in a machine for welding chain links which have tapered ends, of pushers for forcing the heated ends of the links together to effect a weld, electrodes for heating the ends of the links, cams for actuating the pushers, each cam having an inclined surface portion so formed that a follow-up pressure is exerted upon opposite sides of the link until the tapered ends have been reduced in length and the cross-sectional area of the joint is substantially the same as the cross-sectional area of the body of the link, and being also formed with a straight surface portion so that pressure is maintained upon the joint until the weld has set, and means for causing the continuous flow of electricity through the joint during the welding period.

7. The combination, in a machine for welding chain links which have tapered ends, of pushers for forcing the heated ends of the links together to effect a weld, electrodes for heating the ends of the links, cams for actuating the pushers, each cam having an inclined surface portion so formed that pressure is exerted upon opposite sides of the link until the tapered ends have been reduced in length and the cross-sectional area of the joint is substantially the same as the cross-sectional area of the body of the link, and being also so formed that such pressure is maintained until the weld has set, means for causing the continuous flow of electricity through the joint during the welding period, and means for causing an intermittent flow of electricity through the finished welded joint, whereby the proper temperature is maintained for subsequent operation upon the joint.

8. The combination, in a machine for welding chain links which have tapered ends, of pushers for forcing the heated ends of the links together to effect a weld, electrodes for heating the ends of the links, cams for actuating the pushers, each cam having an inclined surface portion so formed that a follow-up pressure is exerted upon opposite sides of the link until the tapered ends have been reduced in length and the cross-sectional area of the joint is substantially the same as the cross-sectional area of the body of the link, and being also formed with a straight surface portion so that pressure is maintained until the weld has set, electric contacts for controlling the flow of electricity to the welded joint, a control disc associated with the contact means, and a contact arm carried by said control disc for holding the contact means closed during the welding period.

9. The combination, in a machine for welding chain links which have tapered ends, of pushers for forcing the heated ends of the links together to effect a weld, electrodes for heating the ends of the links, cams for actuating the pushers, each cam having an inclined surface portion so formed that a follow-up pressure is exerted upon opposite sides of the link until the tapered ends have been reduced in length and the cross-sectional area of the joint is substantially the same as the cross-sectional area of the body of the link, and being also so formed that such pressure is maintained until the weld has set, electric contacts for controlling the flow of electricity to the welded joint, a control disc associated with the contact means, a contact arm carried by said control disc for holding the contact means closed during the welding period, and contact pins carried by the control disc for intermittently closing the contact means, whereby the proper temperature is maintained in the link for subsequent operation upon the joint.

FRANK E. STAHL.